(12) United States Patent
Scherrle et al.

(10) Patent No.: US 9,267,506 B2
(45) Date of Patent: Feb. 23, 2016

(54) COMPRESSION DEVICE AND METHOD FOR COOLING A COMPRESSION MEDIUM

(75) Inventors: Jan Scherrle, Crailsheim (DE); Stefan Hutzenlaub, Crailsheim (DE); Bernhard Schust, Kressberg (DE); Harald Hoffeld, Crailsheim (DE); Nick Jackson Breese, Owasso, OK (US)

(73) Assignee: Voith Patent GmbH, Heidenheim (DE)

( * ) Notice: Subject to any disclaimer, the term of this patent is extended or adjusted under 35 U.S.C. 154(b) by 340 days.

(21) Appl. No.: 13/504,153

(22) PCT Filed: Jun. 7, 2011

(86) PCT No.: PCT/EP2011/002776
§ 371 (c)(1),
(2), (4) Date: Dec. 4, 2012

(87) PCT Pub. No.: WO2011/154120
PCT Pub. Date: Dec. 15, 2011

(65) Prior Publication Data
US 2013/0101388 A1 Apr. 25, 2013

(30) Foreign Application Priority Data
Jun. 7, 2010 (DE) .................. 10 2010 022 849

(51) Int. Cl.
*F04D 25/02* (2006.01)
*F04B 39/06* (2006.01)
*F04D 25/16* (2006.01)
*F04D 29/58* (2006.01)
*F16D 33/06* (2006.01)

(52) U.S. Cl.
CPC .............. *F04D 25/02* (2013.01); *F04B 39/066* (2013.01); *F04D 25/022* (2013.01); *F04D 25/166* (2013.01); *F04D 29/5826* (2013.01); *F16D 33/06* (2013.01)

(58) Field of Classification Search
CPC ... F04D 25/022; F04D 25/166; F04B 39/066; F16D 33/06
USPC .................................................. 60/456, 431
See application file for complete search history.

(56) References Cited

U.S. PATENT DOCUMENTS 3,893,555 A    7/1975  Elmer
5,657,838 A *  8/1997  Vogelsang et al. ............ 188/154
(Continued)

FOREIGN PATENT DOCUMENTS

| DE | 2 414 017  | 12/1974 |
|----|------------|---------|
| DE | 197 02 973 | 8/1997  |
| DE | 196 27 618 | 1/1998  |
| DE | 100 46 828 | 3/2002  |

(Continued)

*Primary Examiner* — Thomas E Lazo
(74) *Attorney, Agent, or Firm* — Faegre Baker Daniels LLP

(57) ABSTRACT

The invention concerns a compression device fitted with a drive unit; with a compressor driven by the drive unit, which compresses a gaseous compression medium; with a cooling device, comprising at least one fan wheel, which cools the compression medium; the fan wheel is in drive connection with the drive unit or a second drive unit additionally provided, in order to be thereby driven in rotation. The invention is characterized in that a hydrodynamic clutch is arranged in the drive connection, via which the fan wheel is driven hydrodynamically, and the drive power transmission of the hydrodynamic clutch can be modified in operation by pressurizing the hydrodynamic clutch with a control pressure medium, wherein the compression medium is the control pressure medium at the same time.

21 Claims, 2 Drawing Sheets

(56) References Cited

U.S. PATENT DOCUMENTS

| | | |
|---|---|---|
| 5,893,441 A | 4/1999 | Reeb |
| 7,341,026 B2 * | 3/2008 | Laukemann ............... 123/41.12 |
| 7,426,826 B2 | 9/2008 | Adleff |
| 7,681,391 B2 | 3/2010 | Kley et al. |
| 2011/0194948 A1 * | 8/2011 | Kley et al. ...................... 417/53 |

FOREIGN PATENT DOCUMENTS

| | | |
|---|---|---|
| DE | 103 15 402 | 11/2004 |
| DE | 10 2005 004 524 | 5/2006 |
| WO | 02/099281 | 12/2002 |
| WO | 2006/061252 | 6/2006 |

* cited by examiner

COMPRESSION DEVICE AND METHOD FOR COOLING A COMPRESSION MEDIUM

CROSS-REFERENCE TO RELATED APPLICATION

This application is related to and claims the benefit under 35 U.S.C. §119 and 35 U.S.C. §365 of International Application No. PCT/EP2011/002776, filed Jun. 7, 2011, the disclosure of which is expressly incorporated herein by reference.

The present invention concerns a compression device and a method intended for cooling a compression medium, which is compressed or to be compressed by means of a compressor.

Compression devices and corresponding methods, as concerned by the present invention according to an embodiment, are used for instance for the supply of gas or the storage of gas, of another gas than air, for instance a process gas or a gas as a primary energy carrier for heating purposes. To do so, the gas is compresses by means of a compressor which is actuated by a drive unit in order to be stored or forwarded. The present invention can be used according to an embodiment also for the storage of an exhaust gas, in particular a CO2-containing exhaust gas, which is compressed by means of a compressor and is stored in a reservoir, in particular an underground reservoir.

With such application cases, the gaseous compression medium may knowingly have a high temperature after being compressed, which requires cooling of the compression medium. This cooling is important, in particular during compression of ignitable or flammable gases.

In particular in mobile installations, in which the compressor is driven by a diesel engine, sets forth a particularly straightforward solution, to drive a fan wheel by means of the diesel engine and to use its cooling airflow for cooling the compression medium at the same time. The problem is here that the fan wheel always rotates proportionally to the rotation speed of the diesel engine and that the generated cooling airflow is not optimally adapted to the actual cooling efficiency, since said efficiency depends on different constraints. This causes on the one hand unnecessary high fuel consumption of the diesel engine, if especially the fan wheel generates unnecessary large cooling airflow and includes the risk on the other side of insufficient cooling in operating conditions at a comparatively low rotation speed of the diesel engine or for instance at high surrounding temperatures.

Regarding the documentary state of the art reference is made to the following documents:

DE 10 2005 04 524 B3
DE 103 15 402 A1
DE 100 46 828 A1
WO 2006/061252 A1

The object of the present invention is to provide a compression device and a method for cooling a compression medium which is compressed or to be compressed by means of a compressor, in which the generated cooling efficiency is adapted to suit the needs. The solution provided by the invention shall enable at the same time existing installations to be retrofitted easily, to offer a simple and reliable construction while dispensing extensively with new external control systems and sources of energy.

The compression device according to the invention, which in particular is designed as a mobile device, includes a drive unit and a compressor driven by the drive unit, which compresses a gaseous compression medium. The drive unit is designed for instance as a combustion engine, in particular a diesel engine. The gaseous compression medium can be in particular another gas than air, for instance a process gas or a combustion gas, in particular methane gas, a methane gas mixture, natural gas or natural gas mixture.

The compression device according to the invention moreover presents a cooling device, comprising at least one fan wheel, which cools the compression medium. Generally, the compression medium is cooled after being compressed, subsequently on the pressure side of the compressor.

The fan wheel is driven in rotation by means of a drive connection of the drive unit, which also drives the compressor, or a second drive unit additionally provided, so that it generates a cooling airflow. The cooling airflow cools the compression medium directly or via a component connected to the compression medium for the transmission of heat, for instance a heat exchanger through which flows the compression medium, subjected to the cooling airflow.

According to the invention, a hydrodynamic clutch is arranged in drive connection between the drive unit or the second drive unit and the fan wheel, via which clutch the fan wheel is driven hydrodynamically. Such a hydrodynamic clutch comprises, as known by the man of the art, a pump wheel and a turbine wheel, which form together a toroidal working compartment, in which a working medium can be introduced, so as to transmit the drive power hydrodynamically from the pump wheel to the turbine wheel. Advantageously, the hydrodynamic clutch has no guide wheel and includes exclusively a single pump wheel and a single turbine wheel.

According to the invention, the drive power transmission of the hydrodynamic clutch and hence the rotation speed of the fan wheel can be modified while the hydrodynamic clutch is operating and thus in such a way, that the hydrodynamic clutch is pressurised by means of a control pressure medium. Pressurising with the control pressure medium can hence cause more or less strong displacement of working medium into or from the working compartment or additionally or alternately the more or less strong insertion of a throttle element in the circular flow of the working medium in the working compartment, in order thereby to impair the circular flow more or less wherein the shift of the throttle element is triggered by the pressurisation of the control pressure medium. The further the throttle element is inserted into the circular flow, the stronger the circular flow in the work space is disturbed and the smaller the transmitted drive power.

According to the invention, the compression medium is now the control pressure medium at the same time.

The hydrodynamic clutch is subjected to the control pressure medium, as which the compression medium is used, advantageously depending on the temperature in such a way that the more the working compartment is filled with working medium or the further the throttle element is removed from the circular flow in the working compartment, the higher the temperature of the compression medium, so that the fan wheel rotates with increasing rotation speed as the temperature of the compression medium rises, thereby causing the generated cooling airflow to increase accordingly. It can thus be provided to that end that the compression medium is only used as a control pressure medium and the actual magnitude of the control pressure applied to the hydrodynamic clutch is adjusted by a control valve or a regulating valve in a pressure gas pipe from the pressure side of the compressor to the hydrodynamic clutch. According to another possible embodiment, the compressed gas pipe does not include any control or regulating member, and the control pressure of the control pressure medium applied to the hydrodynamic clutch is proportional or approximately equal to the pressure of the compression medium in the compressor or on the pressure side of the compressor.

A storage compartment for working medium is preferably provided inside the hydrodynamic clutch or outside the hydrodynamic clutch, but associated thereto, for accommodating the working medium which is not situated in the working compartment. This storage compartment can now be sized in order to form an air compartment or a gas compartment above a liquid level of the working medium, i.e. oil or water in particular. This gas compartment can now be pressurised with the pressure of the compression medium, for instance via the aforementioned compressed gas pipe with the control valve, so that either the compression medium is introduced into this gas compartment, which is in direct contact with the surface of the working medium, or a displacement is caused in the storage compartment, in particular in the gas compartment thereof, by means of the compression medium, which is however separated from the working medium or from the gas compartment or a portion of the gas compartment via a gas-tight mobile and/or flexible element, for instance a piston or a membrane.

The more the storage compartment is pressurised with the control pressure medium or the compression medium, the stronger the working medium is repelled from the storage compartment into the working compartment. Conversely, if the pressurisation of the storage compartment is reduced, working medium can flow back from the working compartment into the storage compartment and thereby increasingly empty the working compartment.

It is advantageous if the connection for conveying the working medium is not directly arranged between the storage compartment and the working compartment but a closed (external) working medium circuit is provided from a working compartment outlet, in particular via a cooler to a working compartment inlet, in which the working medium exiting from the working compartment is pumped in particular via the cooler back into the working compartment through the working compartment inlet, and the storage compartment outside the working compartment is connected on the closed working medium circuit for conveying the working medium, for instance while emerging behind the cooler. Consequently, there is no direct exchange of working medium between the working compartment and the storage compartment, but the working medium from the storage compartment is introduced into the closed (external) working medium circuit outside the working compartment and is also evacuated advantageously at the same location, so that notably only one single connection for conveying the working medium need to be provided between the storage compartment and the working compartment.

In order to maintain a forced flow in the closed working medium circuit outside the working compartment, the hydrodynamic clutch can comprise a dynamic pressure pump, which penetrates into the working compartment or an auxiliary compartment of the hydrodynamic clutch, in which working medium flows from the working compartment, in such a way that a dynamic pressure is generated upstream of the muzzle of the dynamic pressure pump through the operation of the hydrodynamic clutch, in particular by the rotation of the blade wheels, by means of which dynamic pressure the working medium is pumped out of the working compartment or the auxiliary compartment into the closed external working medium circuit.

The storage compartment can for instance be arranged in annular fashion inside the hydrodynamic clutch outside the working compartment and enclosing said working compartment. According to a first embodiment, the storage compartment rotates therewith. It is however particularly advantageous when the storage compartment is designed stationary, whereas conversely the blade wheels of the hydrodynamic clutch (pump wheel and turbine wheel) forming the working compartment rotate radially inside the storage compartment, however advantageously separated by a wall, so that the working medium situated in the storage compartment and in particular the compression medium is not whirled through the rotating blade wheels.

The control valve, which is advantageously installed in the compressed gas pipe between the pressure side of the compressor and the storage compartment, is advantageously designed in such a way that it has an air discharge position in which it locks the compressed gas pipe in the direction of the compressor in a pressure-tight fashion, so that no compressed gas can escape from the compressor or a compressed gas reservoir connected downstream thereof, and vents the compressed gas pipe in the direction of the storage compartment partially or fully, so that the pressure in the storage compartment falls accordingly and working medium flows back from the working compartment into the storage compartment, the latter advantageously via the closed external working medium circuit described above. In a second switching position, the control valve can then interrupt the venting and the compression medium as a control pressure medium pass in the direction of the storage compartment.

It should also be noted basically to subject the working compartment even to the control pressure medium or the compression medium—with or without mobile and/or flexible element of the type described previously—, to displace working medium from the working compartment with increasing pressure.

In order to provide a particularly compact and also mobile compression device according to an embodiment, the drive unit, which is then designed in particular as a diesel engine, can include a main power takeoff and an auxiliary power takeoff, and the compressor can be connected on the main power takeoff in drive connection, to be driven by said main power takeoff, and the fan wheel can be connected on the auxiliary power takeoff in drive connection to be driven by said auxiliary power takeoff. Advantageously, the power generated via the main power takeoff corresponds to a multiple of the power generated via the auxiliary power takeoff. Moreover, the main power takeoff can be positioned on one side of the drive unit, in particular on a front of the combustion engine and the auxiliary power takeoff can be positioned on an opposite side of the drive unit, in particular of the second front of the combustion engine.

A transmission ratio can be provided between the drive unit and the hydrodynamic clutch so that the pump wheel of the hydrodynamic clutch rotates faster or slower than the output shaft of the drive unit. Additionally or alternately, a transmission ratio can be also provided between the turbine wheel of the hydrodynamic clutch and the fan wheel so that the fan wheel rotates faster or slower than the turbine wheel. One or both transmission ratios are advantageously designed as purely mechanical connections, for instance through a pair of toothed gears, in particular a spur wheel gear.

To prevent reliably the occurrence of an ignitable mixture in the hydrodynamic clutch, in particular in the working compartment thereof, the compression medium, as represented, can be separated from the working medium in a pressure-tight fashion, for instance through a mobile and/or flexible element between the region guiding the compression medium and the region guiding the working medium, in particular in the storage compartment. Alternately or additionally, measures may also be taken to reduce the concentration of the compression medium inside the regions guiding the working medium, into which also air can flow. For instance, the working compartment can be flushed permanently with air, in particular fresh air, in order to expel possibly infiltrated compression medium. It is also possible to increase the concentration of the compression medium inside the hydrodynamic clutch, in particular in the working compartment thereof, selectively by introducing the compression medium, thereby to reduce the oxygen content. This also enables to avoid the occurrence of an ignitable mixture, whereas it should be noted that under certain circumstances the working medium of the hydrodynamic clutch, for instance oil, loses compression medium in case of contact with the same and is transported into another region, to be released again thereon.

A method according to the invention, which is performed in particular with the compression device according to the invention previously described, sets forth, to drive the fan wheel by means of the drive unit, which also drives the compressor, or by means of the second drive unit additionally provided, so that it is brought into rotation and generates a cooling airflow. The compression medium or a component connected thereto for the transmission of heat, for instance a heat transmitter, which is flowed through by the compression medium and flowed around by the cooling airflow or conversely, is subjected to the cooling airflow, so as to divert heat from the compression medium, whereas usually a forced convection takes place on the surface of the heat transmitter due to the forced application of the cooling airflow.

The fan wheel is driven by the drive unit via a hydrodynamic clutch, and the rotation speed of the fan wheel is controlled or regulated by the pressurisation of the control pressure medium applied to the hydrodynamic clutch which defines the power transmission of the hydrodynamic clutch, inasmuch as the power transmission and hence the rotation speed of the fan wheel is modified by varying the pressure of the control pressure medium.

According to the invention, the compression medium is used as a control pressure medium and for that purpose, is conveyed to the hydrodynamic clutch, for instance the storage compartment described previously.

The invention will be described below using exemplary embodiments and the figures by way of example.

Wherein

Figure 1:
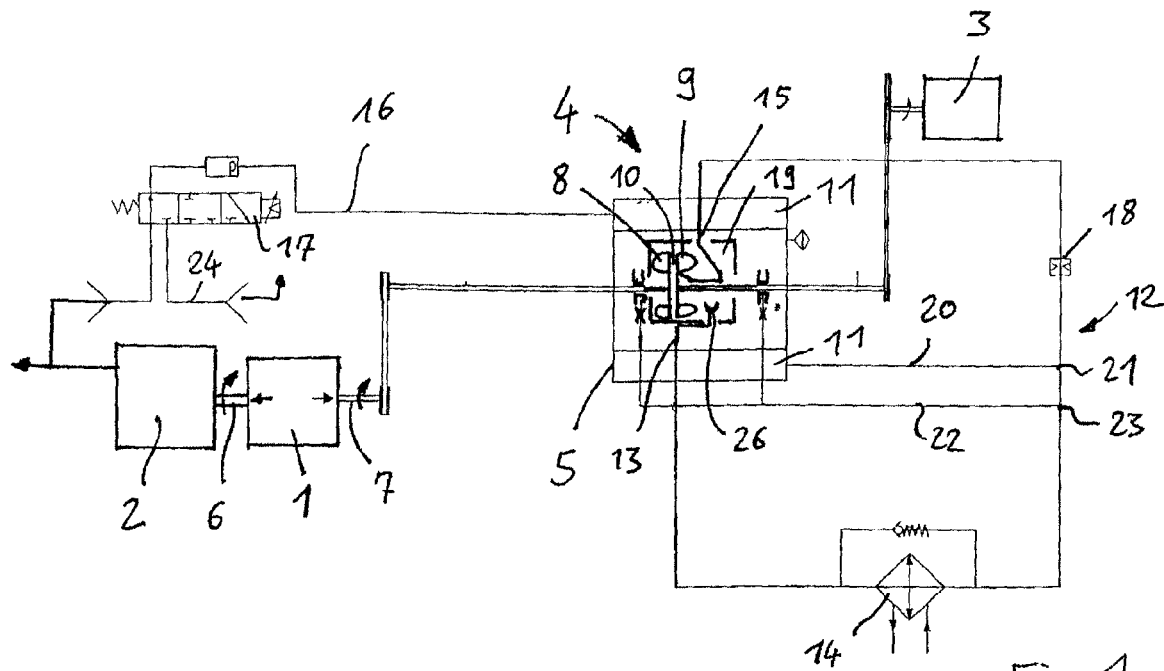
FIG. 1 is a diagrammatical illustration of a first possible embodiment of the invention.

FIG. 1 represents schematically a compression device realised according to the invention fitted with a drive unit 1, for instance in the form of a diesel engine. The drive unit 1 drives a compressor 2 via a main power takeoff 6 and a fan wheel 3 via an auxiliary power takeoff 7.

The rotating connection between the auxiliary power takeoff 7 and the fan wheel 3 is formed by a drive connection 4, which is guided via a hydrodynamic clutch 5. In this instance, a gear stage is provided in the drive connection 4 in the direction of the drive power flow respectively upstream and downstream of the hydrodynamic clutch 5, formed respectively by a belt drive in the illustrated exemplary embodiment.

It goes without saying that other gear stages or an embodiment without gear stages can also be considered.

The selection of the diameter of the pulleys enables in the present embodiment the hydrodynamic clutch to rotate at the speed of the auxiliary power takeoff 7, whereas conversely the fan wheel 3 will rotate slower with respect to the hydrodynamic clutch 5.

The hydrodynamic clutch 5 includes a pump wheel 8 and a turbine wheel 9, which together form a working compartment 10 which can be filled with a working medium. Moreover a revolving auxiliary compartment 19 is provided in the hydrodynamic clutch 5, whereas the filling condition of said auxiliary compartment correlates with the filling condition of the working compartment 10. The auxiliary compartment 19 can for instance be positioned, as shown, axially beside the working compartment 10.

A ring-shaped storage compartment 11 is positioned radially outside the working compartment 10 and in this instance also radially outside the auxiliary compartment 19. The storage compartment 11 does not rotate with the pump wheel 8 and the turbine wheel 9, but is maintained stationary in a housing.

For cooling the working medium, an external closed working medium circuit 12 is provided in which the working medium is cooled. For that purpose, the working medium exist from the hydrodynamic clutch via a working compartment outlet 13, flows through a cooler 14, then a orifice 18 and finally through a working compartment inlet 15 back into the working compartment 10 of the hydrodynamic clutch 5. The closed working medium circuit 12 can hence be led out completely of the hydrodynamic clutch 5 or of the compression device, if for instance the cooler 14 is in a separate position therefrom. It goes without saying that the cooler 14 can be added on the hydrodynamic clutch 5 or installed in the hydrodynamic clutch 5, so that accordingly some of said pipes or all the pipes can be run inside the hydrodynamic clutch 5.

A compressed gas pipe 16 is connected on the pressure side of the compressor 2 and on the storage compartment 11, in order to introduce the compression medium into the storage compartment 11 in pressurised condition, in order thus to displace more or less working medium from the storage compartment 11 into the external closed working medium circuit 12, see the connection pipe, here the only connection pipe 20 between the storage compartment 11 and the connection 21 to the closed working medium circuit 12 between the cooler 14 and the orifice 18. The connection pipe 20 can be provided outside or inside the hydrodynamic clutch 5, the latter in particular in the form of a channel formed in the hydrodynamic clutch 5.

For lubricating the bearings of the hydrodynamic clutch 5, a second connection pipe 22 is moreover provided, which connects the bearings to the closed working medium circuit 12 here via a connection point 23 in the region of the connection point 21.

A control valve 17 is provided in the compressed gas pipe 16 to vary the control pressure transferred into the storage compartment 11 or the pressure of the compression medium introduced into the storage compartment 11. The control valve 17 is for instance designed as a valve with constant regulation.

In the illustrated exemplary embodiment, the control valve 17 is designed as a controlled or regulated directional control valve with a first position, in which the venting pipe 24 is separated from the compressed gas pipe 16 in a pressure-tight fashion and a guiding connection is created between the compressor 2 respectively its pressure side and the storage compartment 11, and a second position, in which the storage compartment 11 is separated from the compressor 2 in a pressure-tight fashion and a flow-guiding connection is created between the venting pipe 24 and the compressed gas pipe 16.

In the exemplary embodiment illustrated on FIG. 1, the hydrodynamic clutch 5 has a dynamic pressure pump 26 upstream of whose muzzle a dynamic pressure forms while the hydrodynamic clutch is operating 5, due to the rotation of the pump wheel 8 and of the turbine wheel 9, by means of which dynamic pressure the working medium is pumped out of the working compartment 10 or here directly out of the auxiliary compartment 19 into and through the closed external circuit 12. The realisation of such a dynamic pressure pump is not mandatory. Also, another pump can be provided instead of the dynamic pressure pump.

Figure 2:
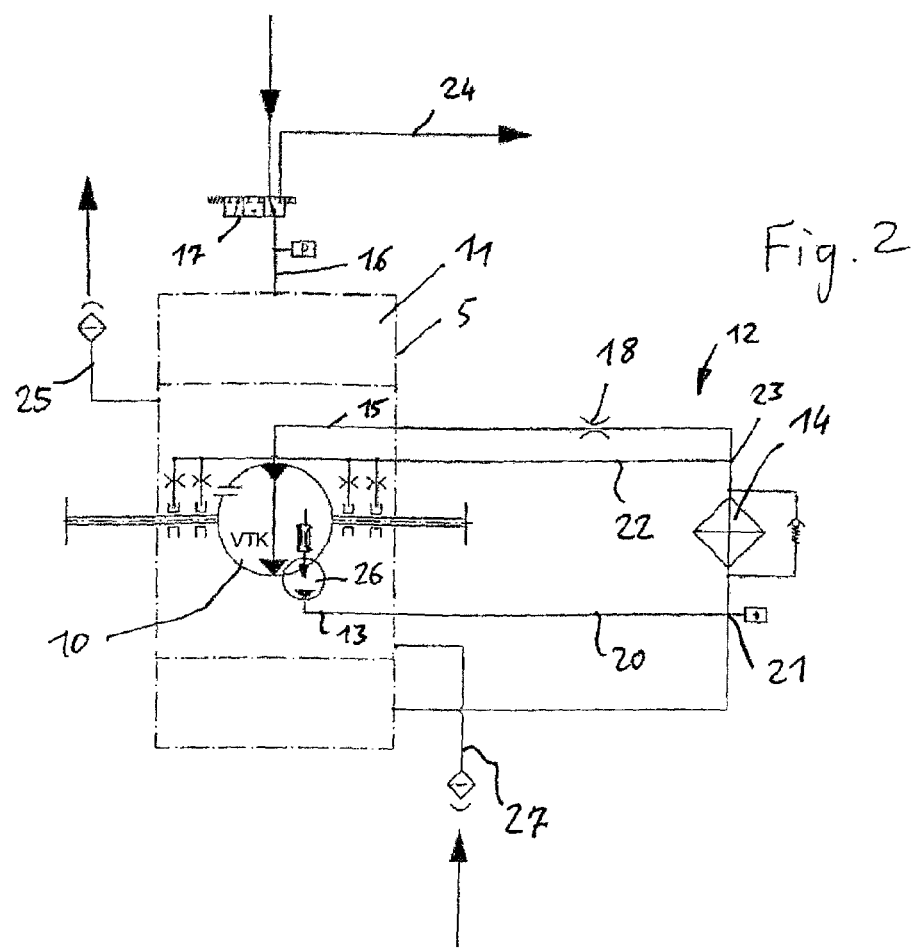
FIG. 2 shows an embodiment according to FIG. 1 with a permanent flushing, additionally provided, of the hydrodynamic clutch with air, to avoid an inadmissible concentration of the compression medium.

FIG. 2, which depicts in a simplified fashion and schematically a partial region of FIG. 1, shows an air inlet pipe 27 and an air outlet pipe 25. Both these pipes 27, 25 secure an ongoing air throughput through the hydrodynamic clutch 5 or the working compartment 10 thereof, in order to expel the transported gaseous compression medium, which for instance is a natural gas, into the hydrodynamic clutch 5 or into the working compartment 10 and to prevent formation of an ignitable mixture. Air filters can be provided in the air inlet pipe 27 and the air outlet pipe 25.

In distinction from the exemplary embodiment according to FIG. 1, the connection point 21 of the connection pipe 20 according to FIG. 2 is positioned between the storage compartment 11 and the external closed circuit 12 in the flow direction of the working medium upstream of the cooler 14, whereas conversely the connection point 23 for the connection pipe 22 for lubricating the bearings of the hydrodynamic clutch 5 downstream of the cooler 14 has been preserved. It goes without saying that the positioning of the connection points 21, 23 could also be reversed or designed in a different way.

Figure 3:
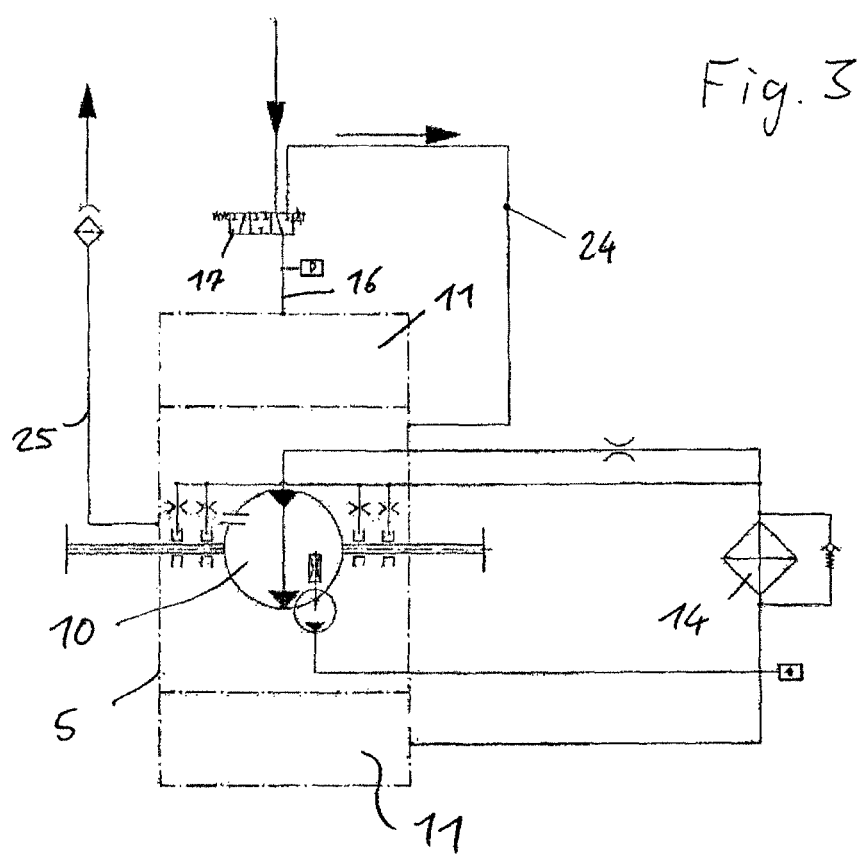
FIG. 3 shows an embodiment similar to that of FIG. 2, however with a targeted concentration of compression medium inside the hydrodynamic clutch, to expel air and hence oxygen therefrom.

In the exemplary embodiment according to FIG. 3, the venting pipe 24, in deviation from the exemplary embodiments according to FIGS. 1 and 2, does not emerge to the surrounding atmosphere, but in the hydrodynamic clutch 5, in particular in the working compartment 10 thereof. Hereby, oxygen-containing air is repelled by introducing the compression medium exiting from the hydrodynamic clutch 5 or the working compartment 10 thereof so as to avoid the occurrence of an ignitable mixture. It goes without saying that compression medium could be injected from another location into the hydrodynamic clutch 5 or the working compartment 10 thereof for repelling oxygen-containing air.

The repelled oxygen-containing air and the injected compression medium can escape via the air outlet pipe 25. If an overpressure valve (non represented) is provided in the air outlet pipe, in particular in the form of a return valve or another throttle member for generating an overpressure in the vented region of the hydrodynamic clutch 5, this overpressure enables efficiently to prevent the penetration or the diffusion of oxygen-containing air via a poorly sealed location, for instance in a seal, or via the air outlet pipe 25 into the hydrodynamic clutch 5 and the risk of formation of an ignitable mixture is reduced.

The invention claimed is:

1. A compression device, comprising:
a drive unit;
a compressor driven by the drive unit, which compresses a gaseous compression medium;
a cooling device, comprising at least one fan wheel, which cools the compression medium;
the fan wheel is in a drive connection with one of the drive unit and a second drive unit additionally provided, in order to be thereby driven in rotation; wherein
a hydrodynamic clutch is arranged in the drive connection, via which the fan wheel is driven hydrodynamically, and
a drive power transmission of the hydrodynamic clutch-can be modified in operation by pressurising the hydrodynamic clutch with a control pressure medium wherein the compression medium is the control pressure medium at the same time.

2. A compression device according to claim 1, wherein the drive unit comprises a combustion engine.

3. A compression device according to claim 2, wherein the drive unit has a main power takeoff and an auxiliary power takeoff, wherein the power generated via the main power takeoff corresponds to a multiple of the power generated via the auxiliary power takeoff, and the compressor is connected to the main power takeoff and the fan wheel to the auxiliary power takeoff.

4. A compression device according to claim 2, wherein the compression medium is another gas than air.

5. A compression device according to claim 2, wherein the hydrodynamic clutch comprises a working compartment which is formed by a pump wheel and a turbine wheel and which can be filled with a working medium, as well as a storage compartment, arranged outside the working compartment, connected to the working compartment for conveying the working medium and for receiving the working medium which is not situated in the working compartment, and the working medium in the storage compartment is pressurised by the control pressure medium with at least one of a direct contact and an indirect pressure transmission, in order to displace working medium from the storage compartment into the working compartment as a function of the applied pressure.

6. The compression device of claim 2, wherein the drive unit comprises a diesel engine.

7. A compression device according to claim 1, wherein the drive unit has a main power takeoff and an auxiliary power takeoff, wherein the power generated via the main power takeoff corresponds to a multiple of the power generated via the auxiliary power takeoff, and the compressor is connected to the main power takeoff and the fan wheel to the auxiliary power takeoff.

8. A compression device according to claim 7, wherein the hydrodynamic clutch comprises a working compartment which is formed by a pump wheel and a turbine wheel and which can be filled with a working medium, as well as a storage compartment, arranged outside the working compartment, connected to the working compartment for conveying the working medium and for receiving the working medium which is not situated in the working compartment, and the working medium in the storage compartment is pressurised by the control pressure medium with at least one of a direct contact or an indirect pressure transmission, in order to displace more or less working medium from the storage compartment into the working compartment as a function of the applied pressure.

9. A compression device according to claim 1, wherein the compression medium is another gas than air.

10. A compression device according to claim 9, wherein the hydrodynamic clutch comprises a working compartment which is formed by a pump wheel and a turbine wheel and which can be filled with a working medium, as well as a storage compartment, arranged outside the working compartment, connected to the working compartment for conveying the working medium and for receiving the working medium which is not situated in the working compartment, and the working medium in the storage compartment is pressurised by the control pressure medium with at least one of a direct contact or an indirect pressure transmission, in order to displace more or less working medium from the storage compartment into the working compartment as a function of the applied pressure.

11. A compression device according to claim 1, wherein the hydrodynamic clutch comprises a working compartment which is formed by a pump wheel and a turbine wheel and which can be filled with a working medium, as well as a storage compartment, arranged outside the working compartment, connected to the working compartment for conveying the working medium and for receiving the working medium which is not situated in the working compartment, and the working medium in the storage compartment is pressurised by the control pressure medium with at least one of a direct contact and an indirect pressure transmission, in order to displace as a function of working medium from the storage compartment into the working compartment by varying the applied pressure.

12. A compression device according to claim 11, wherein the hydrodynamic clutch has a closed working medium circuit from a working compartment outlet and the storage compartment outside the working compartment is connected on the closed working medium circuit for conveying the working medium.

13. A compression device according claim 12, wherein the closed walking medium circuit includes a coder and the storage compartment is connected on the closed working medium circuit, in the flow direction of the working medium in the closed working medium circuit behind the cooler and before a throttle.

14. The compression device of claim 13, wherein the throttle comprises an orifice.

15. A compression device according to claim 12, wherein the storage compartment extends in annular fashion outside the working compartment around said compartment.

16. A compression device according to claim 12, wherein a compressed gas pipe is connected on the pressure side of the compressor and on the storage compartment, which conveys the compression medium into the storage compartment, and that a control valve is provided in the compressed gas pipe for varying the control pressure of the compression medium transferred into the storage compartment.

17. A compression device according to claim 11, wherein the storage compartment extends in annular fashion outside the working compartment around said compartment.

18. A compression device according to claim 17, wherein a compressed gas pipe is connected on the pressure side of the compressor and on the storage compartment, which conveys the compression medium into the storage compartment, and that a control valve is provided in the compressed gas pipe for varying the control pressure of the compression medium transferred into the storage compartment.

19. A compression device according to claim 17, wherein the storage compartment is connected on the closed working medium circuit, in the flow direction of the working medium in the closed working medium circuit behind the cooler- and in particular before a throttle, in particular in the form of an orifice.

20. A compression device according claim 11, wherein a compressed gas pipe is connected on the pressure side of the compressor and on the storage compartment, which conveys the compression medium into the storage compartment, and that a control valve is provided in the compressed gas pipe for varying the control pressure of the compression medium transferred into the storage compartment.

21. A compression device according to claim 20, wherein the control valve has an air discharge position, in which it locks the compressed gas pipe-in the direction of the compressor in a pressure-tight fashion and vents the compressed gas pipe in the direction of the storage compartment partially or fully.

* * * * *